UNITED STATES PATENT OFFICE.

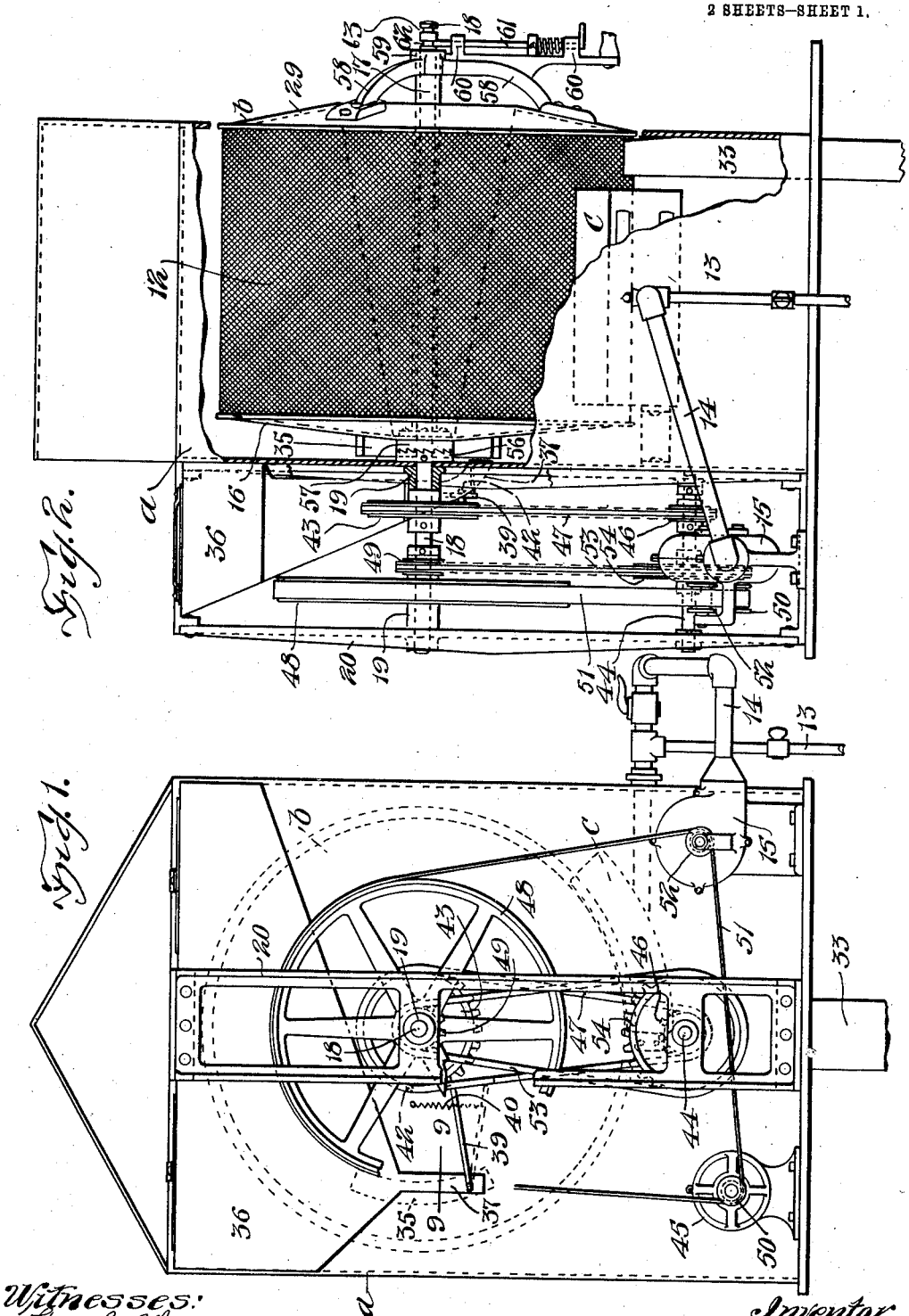

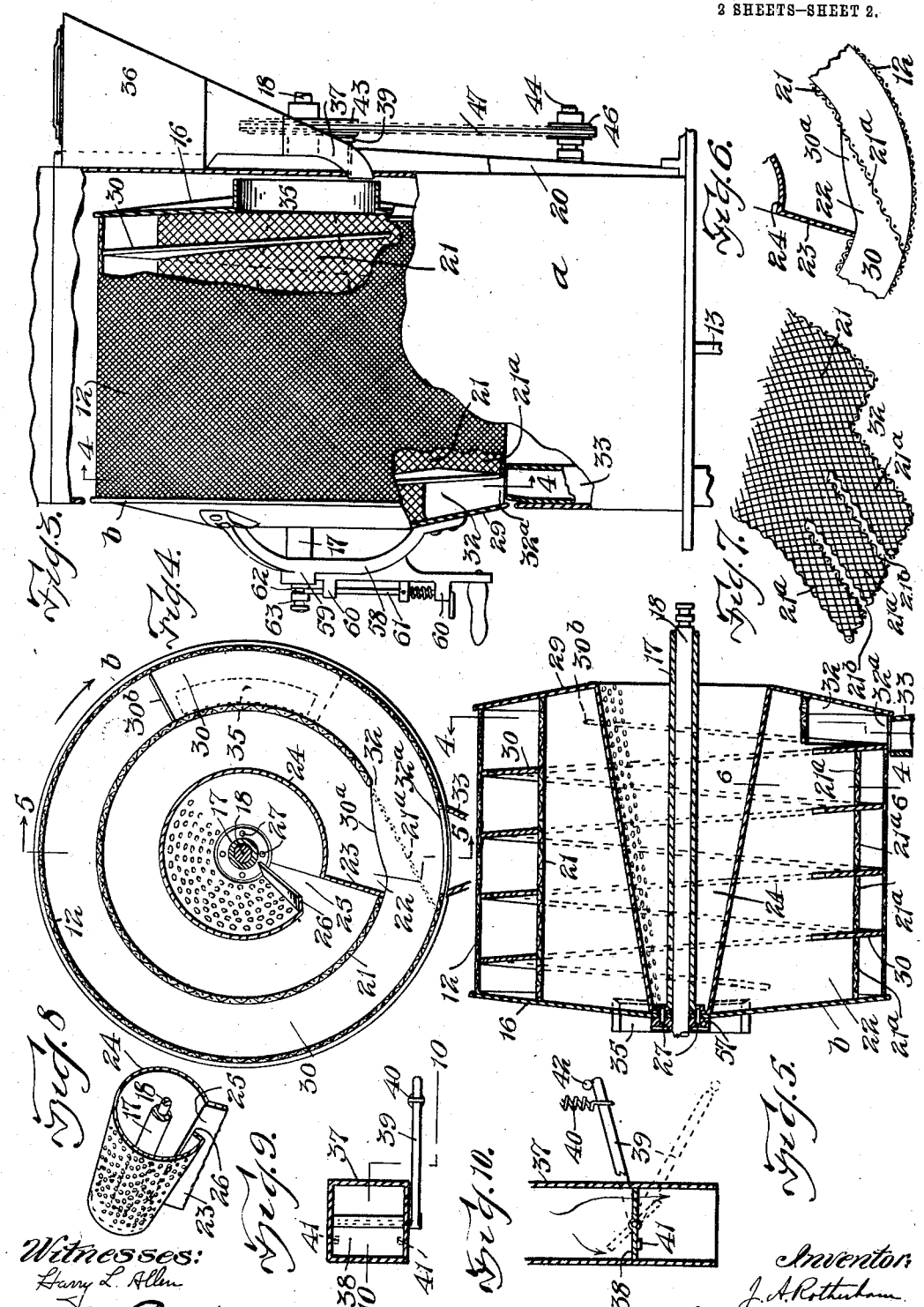

JAMES ALFRED ROTHERHAM, OF REVERE, MASSACHUSETTS.

CORN-POPPING MACHINE.

1,026,052.  Specification of Letters Patent.  Patented May 14, 1912.

Application filed May 25, 1911. Serial No. 629,471.

*To all whom it may concern:*

Be it known that I, JAMES A. ROTHERHAM, a citizen of the United States, and a resident of Revere, in the county of Suffolk and State of Massachusetts, have invented certain new and useful Improvements in Corn-Popping Machines, of which the following is a specification.

This invention has for its object to provide a corn-popping machine adapted to be automatically supplied with corn in charges, to subject the corn to roasting or popping heat, and to automatically separate the popped corn from the unpopped corn and discharge the two grades at separate points.

The invention consists in the improvements which I will now proceed to describe and claim.

Of the accompanying drawings which form a part of this specification,—Figure 1 represents an end elevation of a corn-popping machine embodying my invention; Fig. 2 represents a side elevation of the same, a part of the casing being broken away; Fig. 3 represents an elevation of the opposite side from that shown by Fig. 2, parts of the casing and of the rotary popper being broken away; Fig. 4 represents a section on line 4—4 of Figs. 3 and 5; Fig. 5 represents a section on line 5—5 of Fig. 4; Fig. 6 represents a section on line 6—6 of Fig. 5; Fig. 7 represents a fragmentary perspective view showing a part of the screen and some of the guides thereon hereinafter referred to; Fig. 8 represents a perspective view of the inner end portion of the popped-corn-collector hereinafter referred to; Fig. 9 represents a section on line 9—9 of Fig. 1; Fig. 10 represents a section on line 10—10 of Fig. 9.

Similar reference characters indicate the same or similar parts in all the figures.

In the drawings,—$a$ represents a casing which forms an inclosure around a rotary cylindrical corn-popper $b$ and around a burner $c$ located in suitable relation to the foraminous external surface of the corn-popper to cook corn contained therein. The burner may be of any suitable construction and is preferably of the Bunsen type, gas being supplied to it by a gas pipe 13 and air under pressure by an air pipe 14 connected with a blower 15.

The rotary popper includes a foraminous cylinder 12 which is composed of wire cloth of relatively fine mesh, the openings in it being of such size that uncooked kernels of pop corn cannot pass through it. The corn is inserted as hereinafter described in the cylinder and supported by its inner surface over the burner. The cylinder 12 is supported by a head 16 to which one end of the cylinder is attached, said head being affixed to an elongated sleeve 17 mounted on a driving shaft 18, which is journaled in fixed bearings 19 on a frame 20 at one end of the casing $a$.

21 represents a screen within the cylinder 12 and composed of wire cloth of coarser mesh permitting the passage of unpopped corn, but not of popped corn, through it. The screen 21 is a nearly complete cylinder attached at one end to the head 16 and concentric with the cylinder 12, the continuity of the screen being interrupted by a longitudinal opening 22, Fig. 4, at one side of which are extensions 21$^a$ of the cloth composing the screen, said extensions extending tangentially from the cylindrical portion of the screen to the cylinder 12 between the convolutions of the screw conveyer hereinafter described. The tangential extensions 21$^a$ constitute guides which are caused, by the rotation of the popper in the direction indicated by the arrow in Fig. 4 to direct popped corn carried by the cylinder 12 into the screen 21. The wire cloth of said guides and of the screen 21 are of relatively coarse mesh, its opening being of such size that the popped and expanded corn cannot fall through them and therefore is caused by the rotation of the popper to pass to the interior of the screen 21, while the unpopped corn falls through the openings in the guide and screen and again bears on the interior of the cylinder 12. The popped corn is caused by the rotation of the popper to pass around the inner surface of the screen 21 until it reaches a radial deflector 23 at the opposite side of the opening 22 from the guides 21$^a$. Said deflector is a sheet metal flange formed on a collector 24 for the popped corn, said collector being a tapering tube rigidly attached at its smaller end to the head 16 and supported thereby. The continuity of the wall of the collector 24 is interrupted by a longitudinal opening 25, one edge of the collector being joined to the deflector 23 while the other edge has an inwardly projecting flange 26 adapted to prevent the popped corn from passing outwardly through the opening 25, and to guide the popped corn to the larger outer end of the collector 24. The inner end portion of the collector 24 is shown in perspective by Fig. 8. The tapering form of the collector imparts a downward inclination to its lower side from the smaller to its larger end, so that popped corn entering the collector as described, passes by gravitation to its larger end which is open and permits the escape of the corn into a receptacle, not shown. The collector 24 is of relatively thick and stiff sheet metal and has an inwardly projecting flange or head at its smaller end which is securely attached by bolts 27 (Figs. 4 and 5) to the head 16. The larger end of the collector is provided with an outwardly projecting flange 29 which is attached to and supports the outer ends of the cylinder 12 and screen 21, and constitutes a head which closes the outer ends of the spaces between the collector and the screen, and between the screen 21 and the cylinder 12.

In the space between the screen 21 and the cylinder 12, is a screw conveyer 30 composed of a sheet metal strip helically formed, and adapted to cause a movement of corn from one end of the cylinder 12 to the other when the popper is rotated. The inner helical edge of the strip bears on the outer surface of the screen 21 and its outer helical edge on the inner surface of the cylinder 12. The convolutions of the conveyer strip cross the opening 22, as shown by Figs. 4 and 6, where 30$^a$ designates the inner edges of the crossing portion of two of the said convolutions. 30$^b$ (Figs. 4 and 5) designates the outer end of the conveyer strip.

The guides 21$^a$ are separated from each other by slots 21$^b$ (Fig. 7) through which the conveyer convolutions extend. One corner of the woven wire sheet, forming the screen 21 and guides 21$^a$, is cut away to form an opening 32 (Figs. 3, 4, 5, and 7), said opening being between the outer convolution of the conveyer and the flange 29, and permitting the unpopped corn that has been moved by the conveyer to the outer end of the cylinder 12, to escape through an outlet 32$^a$ formed in the outer end of the cylinder. When the outlet 32$^a$ is brought by the rotation of the popper to the lowest part of the cylinder 12, any unpopped corn that has been advanced by the conveyer to the outer end of the cylinder, falls through the outlet 32$^a$ into a fixed chute 33 in the casing $a$, the discharge being intermittent and occurring only when the outlet 32$^a$ is at the lowest part of the cylinder 12.

It will now be seen that a helical passage is formed by the screw conveyer 30 between the cylinder 12 and the screen 21, and that each of the convolutions of said passage, excepting the outer one (the outer side of which is formed by the flange 29) is interrupted by a guide 21$^a$ which conducts the popped corn into the screen 21 and permits the unpopped corn to drop back upon the inner surface of the cylinder 12. It will also be seen that the said outer convolution of the helical passage is not interrupted by a guide 21$^a$, and therefore that all the corn which reaches said outer convolution is permitted to fall through the outlet 32$^a$. The popped corn which enters the screen 21 is carried by the rotation of the popper in the direction indicated, to the flange 23 which deflects it into the collector 24, said deflector preventing any possibility of the return of the popped corn to the screen, so that a quantity of the popped corn passes through the opening 25 into the collector when the said opening and deflector reach the highest point to which they are carried by the rotation of the popper. The flange 26 and the adjacent surface of the collector 24 form an inclined gutter which, during a considerable part of the rotation of the popper, conducts the popped corn to the open end of the collector. The portion of the collector adjacent to the flange 26 may be perforated, as shown by Fig. 4, this portion constituting a sieve which permits the escape of small particles such as broken hulls, dust, etc., from the popped corn.

The head 16 is provided at one side of the axis of the popper with an inlet 35 formed as a segmental spout projecting outwardly from the head and adapted to receive the corn to be popped and to deliver the same to the inner convolution of the helical passage between the cylinder 12 and screen 21, the corn falling from the spout to the lower portion of the cylinder 12.

36 represents a hopper attached to one end of the casing $a$ and having at its lower portion a spout 37 which is curved inwardly at its lower end, as shown by Figs. 2 and 3 and extends through one of the sides of the casing, the delivering end of the spout being arranged to coincide with the segmental spout 35 and deliver charges of corn to the latter. In the spout 37 is a pivoted gate 38 (Figs. 9 and 10) adapted to obstruct the spout as shown by full lines (Fig. 10) and to be turned as indicated by dotted lines to permit the escape of a charge of corn.

39 represents a lever affixed to the gate 38, and projecting from one side of the spout 37, said arm being normally raised by a spring 40 which yieldingly holds the gate 38 against fixed stop ears 41 in the spout 37, the gate being thus normally closed.

42 represents a tappet projecting from one side of a pulley 43 which is fixed to the shaft 18 and is rotated with said shaft as hereinafter described, the rotation of the shaft causing the tappet to move the arm 39 and gate 38 from the position shown by full lines in Fig. 10, to that shown by dotted lines, thus opening the gate. The movements of the gate are so timed relatively to the rotation of the popper, that the gate is opened only when the segmental spout 35 coincides with the discharging end of the spout 37, so that the corn discharged enters the spout 35, the latter being sufficiently elongated to permit all the discharged corn to enter it.

44 represents a driving shaft journaled in bearings at the lower portion of the frame 20, and impelled by a motor 45 through the intermediate mechanism hereinafter described. The shaft 44 has a sprocket pulley 46 connected by a sprocket chain 47 with the sprocket pulley 43.

48 represents a relatively large belt pulley which is loose on the shaft 18, and is attached to a relatively small sprocket pulley 49 also loose on the shaft 18. The shaft of the motor 45 has a pulley 50 engaging a belt 51 which runs on the pulley 48 and on a pulley 52 on the shaft of the blower 15. A slow rotation is imparted from the motor to the loose pulleys 48 and 49, and a relatively rapid rotation to the blower shaft through the belt 51. The loose sprocket pulley 49 is connected by a sprocket chain 53 with a sprocket pulley 54 affixed to the driving shaft 44. A slow rotation is therefore imparted from the loose sprocket pulley 49 to the driving shaft, said pulley being of considerably smaller diameter than the sprocket pulley 54.

The sprocket pulley 46 is of considerably smaller diameter than the sprocket pulley 43 on the popper shaft 18, so that the popper is rotated slowly. The rotary popper is preferably coupled to the shaft 18 by means adapted to be made inoperative by an endwise movement of the popper on the shaft, so that the rotation of the popper may be arrested without stopping the motor by moving the popper outwardly on the shaft.

56 represents a clutch member affixed to the shaft 18, and 57 represents a complemental clutch member affixed by the bolts 27 to the popper head 16. The sleeve 17 is slidable on the shaft 18 so that the popper may be moved endwise to connect and disconnect the clutch members 56 and 57. The flange 29 is provided with a spider composed of arms 58 bolted to the flange, and a hub 59 which embraces the sleeve 17. On one of the arms 58 are guides 60 in which a spring-pressed detent 61 is movable toward and from the shaft, said detent being adapted to engage a groove 62 in the shaft and prevent endwise movement of the popper on the shaft. When the detent 61 is retracted, the popper may be moved outwardly on the shaft until the clutch member 57 is separated from the clutch member 56, the detent then engaging another groove 63 in the shaft and preventing inward movement of the popper.

I claim:—

1. A rotary corn popper comprising a casing, a foraminous hollow cylinder rotatively mounted in said cylinder, means for causing a movement of corn lengthwise of said cylinder, a collector composed of a tapering tube having a longitudinal opening, and having an inwardly projecting flange at one edge of the opening, and an outwardly projecting flange at the other edge of the opening, means for conducting popped corn from the said foraminous hollow cylinder to the opening of the collector, and means for automatically supplying unpopped corn to one end of said cylinder.

2. A rotary corn popper comprising a foraminous hollow cylinder having an outlet for unpopped corn, a foraminous screen within the cylinder and separated therefrom by an annular space, said screen having a longitudinal opening and a series of tangential extensions projecting across said space and constituting corn guides, the screen having larger openings than the cylinder and being adapted to separate the smaller from the larger kernels entering it, a screw conveyer forming a helical passage in the space between the cylinder and screen, the screen extensions projecting between the convolutions of said conveyer, and interrupting all the convolutions of the helical passage excepting the outer one, said outer convolution communicating with the outlet of the cylinder, and a popped corn collector composed of a tapering tube located within the screen and having a longitudinal opening, an outwardly projecting flange extending across the space between the collector and screen at one edge of the opening in the collector, and an inwardly projecting flange at the opposite edge of said opening, the smaller end of the collector being closed while its larger end is open and constitutes a popped corn outlet.

3. A rotary corn popper comprising a casing, a foraminous hollow cylinder, having an outlet for popped corn, a popped corn collector within the cylinder composed of a tapered tube which is open at its larger end for popped corn, said tube having a longitudinal opening, a closed head forming the inner end of the popper and provided with a corn inlet at one side of the axis of the popper, an annular flange at the larger end of the collector forming the outer end of the popper, means for delivering corn intermittently into the cylinder inlet, means for assorting the corn in the cylinder and transferring the popped corn to the collector, and a fixed chute supported by said casing in position to receive unpopped corn from the outlet of the hollow cylinder.

4. A rotary corn popper comprising a foraminous hollow cylinder having an outlet for unpopped corn, a popped corn collector within the cylinder, composed of a tapered tube which is open at its larger end to provide an outlet for popped corn, said tube having a longitudinal opening, a closed head forming the inner end of the popper and provided with a corn inlet at one side of the axis of the popper, an annular flange at the larger end of the collector forming the outer end of the popper, means for delivering corn intermittently to the cylinder inlet, a foraminous cylindrical screen between the cylinder and the collector, said screen having a longitudinal opening and a series of extensions projecting across the space between the screen and cylinder, and constituting guides to direct corn into the opening of the screen, and a screw conveyer forming a helical passage in said space, all the convolutions of said passage excepting the outer one being interrupted by said guides, and the said outer convolution communicating with the corn outlet of the cylinder, the collector being provided at one edge of its opening with an outwardly projecting flange joined at its outer edge to the screen, and at the other edge of said opening with an inwardly projecting flange forming one side of a corn-conducting gutter.

5. A corn-popping machine comprising a casing, a substantially horizontal foraminous hollow cylinder having an outlet for popped corn, and mounted rotatively in said casing, a popped corn collector within the cylinder composed of a tapered tube which is open at its larger end to provide an outlet for popped corn, means for deflecting popped corn from the cylinder into said collector, a hopper secured to the casing and having an inwardly curved spout at its lower end, a segmental spout carried by the rotary cylinder in a path to receive corn from said curved spout, a pivoted gate mounted in said curved spout, and having a lever, and means rotatively connected with said cylinder to actuate said lever.

In testimony whereof I have affixed my signature, in presence of two witnesses.

JAMES ALFRED ROTHERHAM.

Witnesses:
  C. F. BROWN,
  P. W. PEZZETTI.

---

Copies of this patent may be obtained for five cents each, by addressing the "Commissioner of Patents, Washington, D. C."